United States Patent [19]
Takasaki

[11] Patent Number: 5,121,244
[45] Date of Patent: Jun. 9, 1992

[54] OPTICAL SUBSCRIBER NETWORK TRANSMISSION SYSTEM

[75] Inventor: Yoshitaka Takasaki, Tokorozawa, Japan

[73] Assignee: Hitachi, Ltd., Tokyo, Japan

[21] Appl. No.: 323,711

[22] Filed: Mar. 15, 1989

[30] Foreign Application Priority Data

Mar. 18, 1988 [JP] Japan .................. 63-63245

[51] Int. Cl.⁵ ........................ H04B 10/12
[52] U.S. Cl. ................... 359/161; 359/125; 359/179
[58] Field of Search ......... 455/600, 606, 607, 605, 455/612, 617, 618, 619; 370/1, 3, 4, 16.1, 16; 359/125, 161, 179

[56] References Cited

U.S. PATENT DOCUMENTS

| 4,658,394 | 4/1987 | Cheng et al. | 370/3 |
| 4,704,713 | 11/1987 | Haller et al. | 370/16 |

FOREIGN PATENT DOCUMENTS

| 0004340 | 1/1986 | Japan | 370/4 |
| 0123537 | 5/1989 | Japan | 455/612 |
| 2121637 | 12/1983 | United Kingdom | 455/612 |
| 2198903 | 6/1988 | United Kingdom | 370/3 |

OTHER PUBLICATIONS

"Integrated Circuit for Broad-Band Communications Systems", by H. Reiner, IEEE Journal on Selected Areas in Communications, vol. SAC-4, No. 4, Jul. 1986, pp. 480-487.

"FT3C-A Lightware System for Metropolitan and Intercity Applications" by J. R. Stauffer, IEEE Journal on Selected Areas in Communications, vol. SAC-1, No. 3, Apr. 1983, pp. 413-319.

Primary Examiner—Edward L. Coles, Sr.
Assistant Examiner—L. Pascal
Attorney, Agent, or Firm—Pennie & Edmonds

[57] ABSTRACT

An optical subscriber network transmission system comprises a first optical transmission line transmitting information from center to a subscriber and a second optical transmission line transmitting information from to the subscriber to the center. A plurality of auxiliary optical transmission lines are disposed between the center and the subscriber.

12 Claims, 15 Drawing Sheets 2-4 AUXILIARY FIBER

F I G. 2A
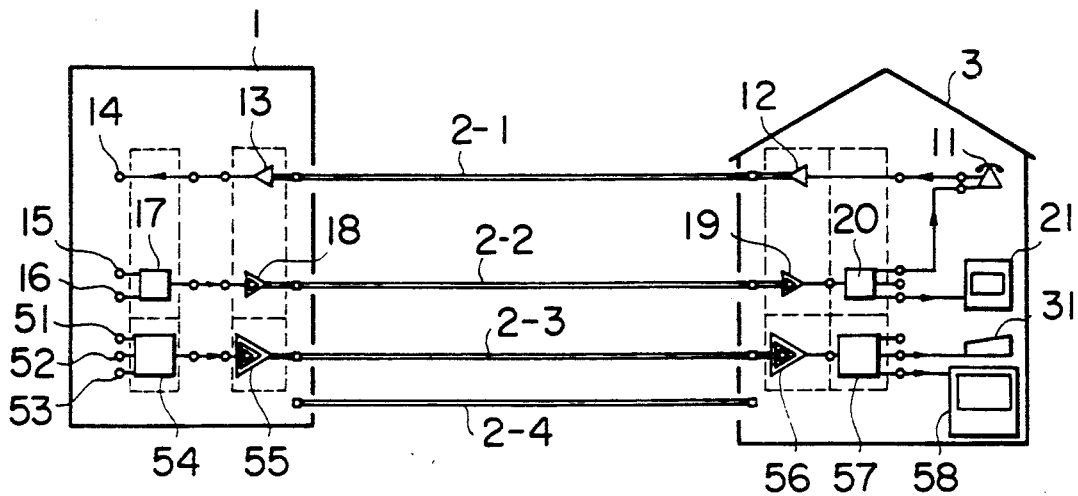
F I G. 2B
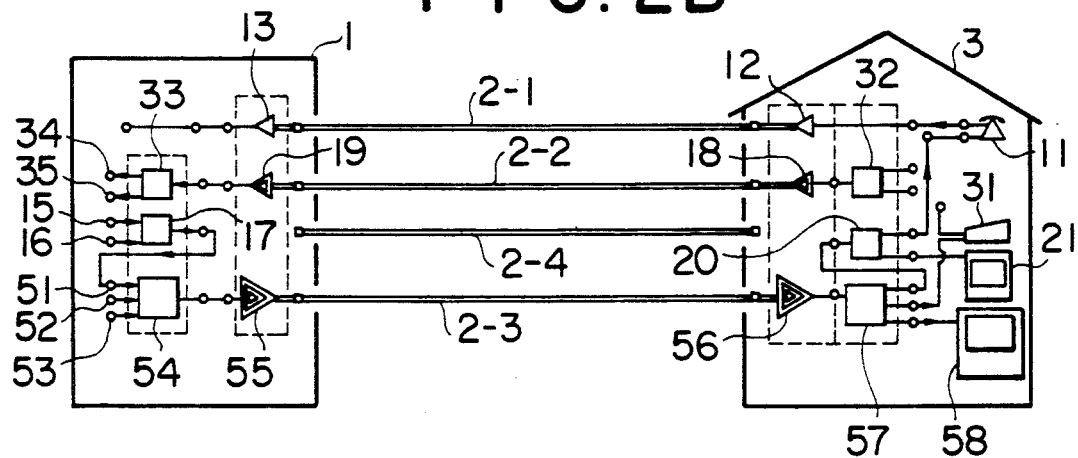
F I G. 2C
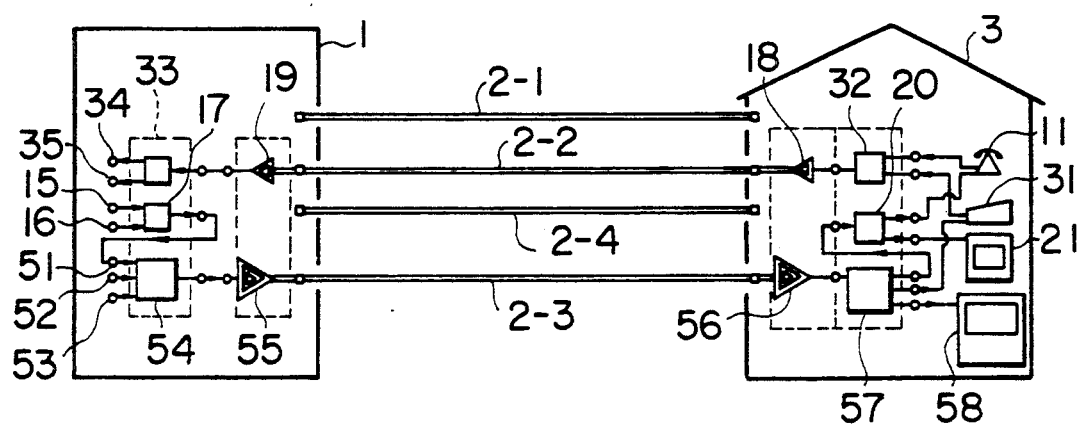

F I G. 11A
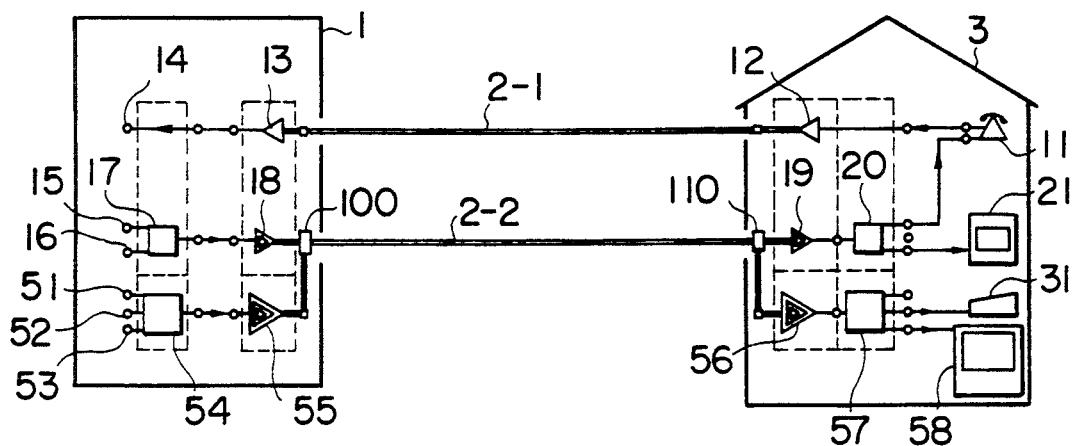
F I G. 11B
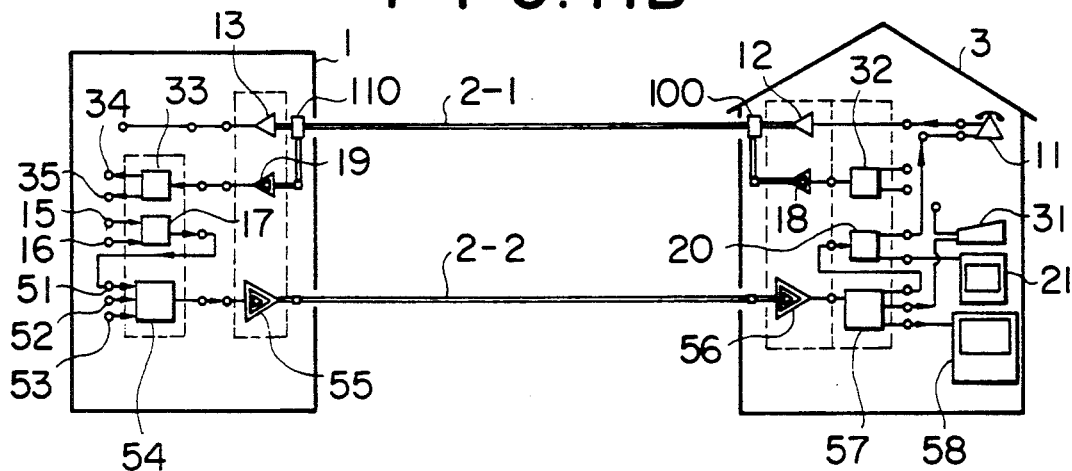
F I G. 11C
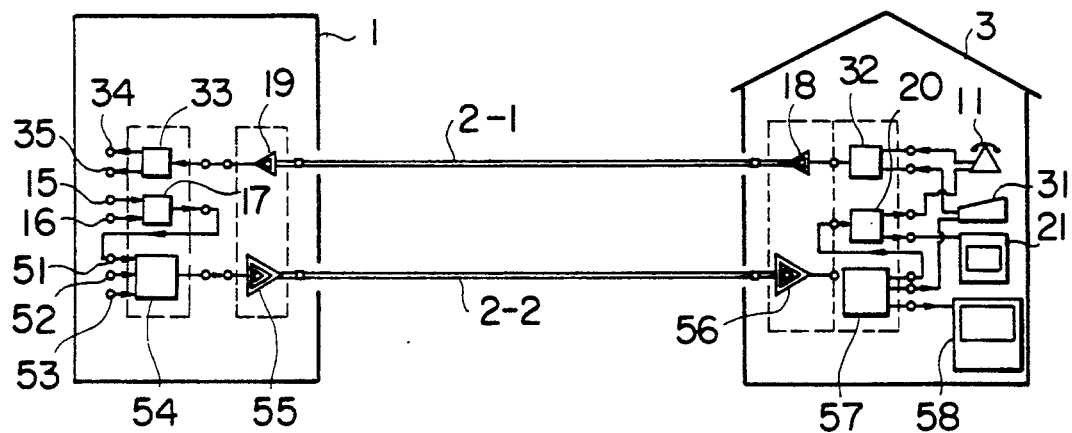

OPTICAL SUBSCRIBER NETWORK TRANSMISSION SYSTEM

BACKGROUND OF THE INVENTION

This invention relates to an optical subscriber network transmission system and in particular to a transmission system suitable for effecting a smooth upgrading of the transmission capacity, in the case where information of large capacity is offered to subscribers by means of single mode optical fibers.

FIG. 4 shows an example of the network offering various sorts of service by means of optical fibers. Service information is transmitted from a center 1 to each of subscribers 3 through an optical fiber 2. Facsimile, pay TV, high definition TV, etc. may be cited in addition to the conventional aural telephonic communication as the content of the service. As a system of this kind, e.g. "Integrated Circuit for Broad-Band Communication Systems" by H. Reiner, IEEE JOURNAL ON SELECTED AREAS IN COMMUNICATIONS, VOL. SAC-4, No. 4, JULY 1986, pp. 480-487 can be cited.

The service can be classified into two types, symmetric and asymmetric. These are defined, respectively as the case in which the information transmission speed in the line from the center to each of the subscribers (downstream transmission line) is equal to that in the line from each of the subscribers to the center (upstream transmission line), such as telephone and facsimile, and the case in; which the capacity of the downstream transmission line is larger than that of the upstream transmission line, such as pay TV and high definition TV.

In general, in an optical subscriber network transmission system, since the symmetric and the asymmetric services have their respective, upstream signals multiplexed onto the upstream transmission line and their respective downstream signals multiplexed onto the same downstream line, the transmission capacity of the downstream transmission line is larger than that of the upstream transmission line.

Further, since single mode fibers having an extremely wide bandwidth are used for the transmission of signals between the center and the subscribers, even the case where a subscriber desires an option for in future service having a still larger capacity of information, it is sufficient to substitute only the transmitter and receiver with ones of higher information transmission capacity, while still using the installed fibers.

In this case, it is more economical by existing equipment to divert the transmitter and receiver for the downstream transmission line to that for the upstream transmission line and to install a new transmitter and receiver having a larger capacity for the downstream transmission line than to install new transmitted and receivers for both the upstream and downstream transmission lines. This will be explained below, referring to FIGS. 5A and 5B.

FIG. 5A shows an example of transmission between the center 1 and a subscriber 3, in the case where he subscribes to the telephone and the pay TV. Aural signals from a telephone set 11 are transmitted by the transmitter 12 to the center 1 through an optical fiber 2-1 in the upstream transmission line and received by the receiver 13.

On the other hand, in the downstream transmission line, aural signals applied to a terminal 15 and pay TV signals to another terminal 17. They are multiplexed by a multiplexer 17 and transmitted by a transmitter 18 through an optical fiber 2-2 in the downstream transmission line. They are received by a receiver 19 and demultiplexed by a demultiplexer 20 into aural and pay TV signals, which are applied to the telephone set 11 and a video receiver 21, respectively.

FIG. 5B shows an example, in which facsimile and high definition TV are added in the system described above. In this case, in the upstream transmission line, apart from aural signals facsimile signals coming from a facsimile set 31 are transmitted to the center side after having been multiplexed by a multiplexer 32. They are demultiplexed by a demultiplexer 33 into the aural and facsimile signals.

Through the downstream transmission line, aural signals applied to a terminal 51 of a demultiplexer 54, pay TV multiplex signals facsimile signals applied to a terminal 52 and high definition TV signals applied to a terminal 53 are multiplexed and transmitted. They are demultiplexed by a demultiplexer 57 and applied to respective receivers.

When the system indicated in FIG. 5A is upgraded to that indicated in FIG. 5B, it is economical to divert the transmitters and receivers 18 - 19 for the downstream transmission line to those for the upstream transmission line in FIG. 5B. However it is necessary therefor to interrupt the operation of the system during a fairly long term for the upgrading work. That is, the transmitter 18 and the receiver 19 in FIG. 5A are moved and substituted for, the transmitter 12 and the receiver 13 and a transmission line is tested. Then, as indicated in FIG. 5B, the multiplexer 32 and the demultiplexer 33 are added to the transmission line and the global upstream transmission line is tested. Then the transmitter 55 and the receiver 56 are newly added to the optical fiber 2-2 in the downstream transmission line and a transmission test is effected. Thereafter, the multiplexer 54 and the demultiplexer 57 are added and the global downstream test is performed. At last, the upstream and downstream transmission lines are tested globally. In the case where this procedure is executed together for several to several tens of subscribers, service interruption of about one week may be needed.

A plurality of transmission lines are used in parallel in U.S. Pat. No. 4,658,394 by Cheng et.al. However, no service interruption described above is taken into account. Further, in "FT3C-A Lightware System for Metropolitan and Intercity Applications" by Stauffer, IEEE Journal of Selected Areas in Communications, Vol. SAC-1, No. 3, April 1983, pp. 413-419, a spare transmission line including transmitters, receivers and relays is used and no attention is paid to effect economically an upgrading of a subscriber network system.

SUMMARY OF THE INVENTION

The object of this invention is to provide an optical subscriber network transmission system capable of shortening the duration of substantially the service interruption incurred in the upgrading of transmission capacity as described above.

A solution of this problem has been already filed by the present inventors (U.S. Ser. No. 123,463, filed Nov. 20, 1987, entitled OPTICAL SUBSCRIBER NETWORK TRANSMISSION SYSTEM).

According to this invention, more than two auxiliary optical transmission lines are prepared. When upgrading the system the upgraded transmission lines are tested by using them so that the service interruption accompanying the upgrading of the service can be avoided.

Further, another system is provided, by which an auxiliary transmission line is constructed by using an optical wavelength multiplexer at the upgrading without preparing previously any auxiliary optical transmission line. These optical transmission lines are constituted, for example, of optical fibers.

For example, two auxiliary optical fibers are prepared. For this reason, in the case where two optical fibers are sufficient heretofore, four (or more, as described later) fibers are necessary. However, recently, the cost for optical fibers is lowering rapidly since optical fibers are installed together in the form of a cable. The increase in the cost due to increasing the number of optical fibers in a cable is negligible with respect to the cost of the cable itself and for the installation thereof. Therefore, the cost reduction effect because of shortening construction term by using auxiliary fibers is considerable.

In this way, it is possible to keep service interruption time to a minimum by constituting a part of a newly installed transmission line by two auxiliary fibers and by using fibers in the existing transmission line as the auxiliary fibers and successively switching them, after having tested this newly installed transmission line without interrupting the service.

BRIEF DESCRIPTION OF THE DRAWINGS

FIGS. 1, 2A, 2B, 2C, 3A, 3B, 3C are schemes illustrating different embodiments of this invention;

FIGS. 11A, 11B, 11C, 12A, 12B, 13A, 13B, 13C, 14A, 14B, 14C, 15A and 15B are schemes illustrating different embodiments of this invention.

DESCRIPTION OF THE PREFERRED EMBODIMENTS

Figure 1:
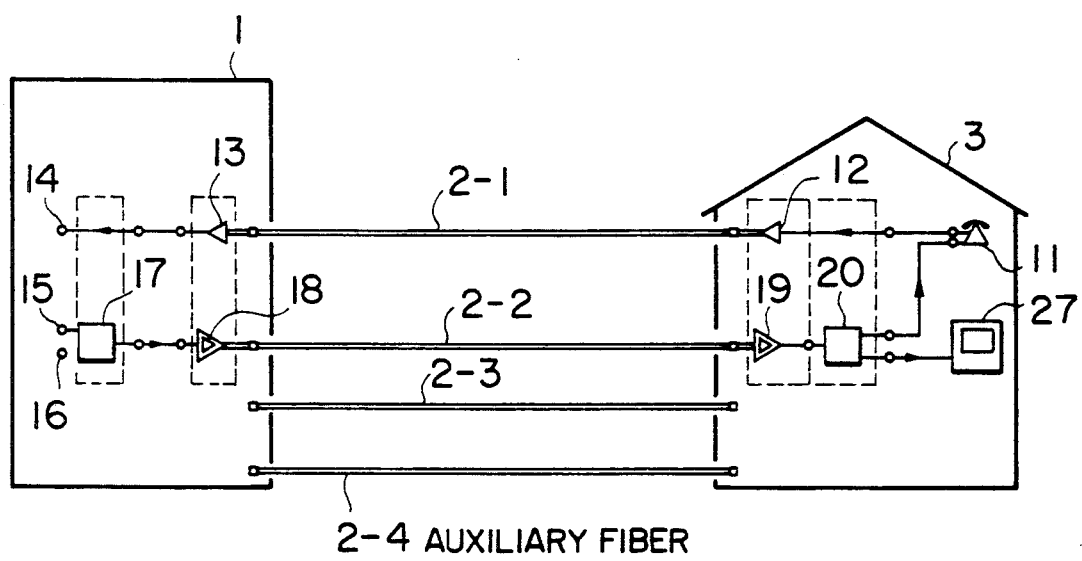

FIG. 1 is a scheme illustrating an embodiment of this invention. In the figure, at first, a transmission line (second downstream transmission line) having a capacity larger than that of the downstream transmission line including the optical fiber 2-2 is constructed by using an auxiliary fiber 2-3. Another auxiliary fiber 2-4 is used as a loop for checking the transmission line when testing it. It is a matter of course that this loop can be tested without interrupting the service. Since this second downstream transmission line can transmit information including information of the first transmission line, it is possible to switch the transmission lines immediately after the termination of the test to continue the service. Then it is possible to construct the second upstream transmission line by using an optical fiber in the first downstream transmission line, which has become unnecessary, as the auxiliary fiber. In this case, an economical effect by efficient use of existing equipment can be obtained, if the second upstream transmission line is constructed by exchanging the transmitter 18 and the receiver 19. Then the service of the first upstream transmission line can be included in the second upstream transmission line as a part thereof after the termination of the test, including the multiplexer using the auxiliary fiber 2-4 as the loop-back circuit for this second upstream transmission circuit.

In this way, it is possible to expect to increase the capacity of the transmission line by eliminating the service interruption or by shortening the service interruption to an extremely short time. The optical fiber 2-1 for the first upstream transmission line, which has become unnecessary, and the auxiliary fiber 2-4 can be used as auxiliary fibers for future further upgrading of the service.

FIGS. 2A, 2B and 2C are schemes for explaining this process in detail.

FIG. 2A shows an example, in which the second downstream transmission line is constructed by using an auxiliary fiber 2-3. A multiplexer 54 on the transmitter side has three input terminals. When the output of the multiplexer 17 is connected with a terminal 51, the service of the first downstream transmission line can be transmitted, included in the second downstream transmission line. In this example the terminal 52 is one for facsimile signals and the terminal 53 is one for high definition TV. The output signal of this multiplexer is applied to a transmitter 55, which has a transmission larger than that of the transmitter 18. These signals are received by a receiver 56. This capacity is, of course, so designed that it is larger than that of the receiver 28. The received signals are demultiplexed by a demultiplexer 57 and inputted into the facsimile set 31 and a high definition TV receiver 58. The loop-back test for this second downstream transmission line can be effected by using the auxiliary fiber 2-4 without service interruption of the first upstream and downstream transmission lines. The loop-back test will be described later in detail. The test can be effected by connecting a circuit simulatively equivalent to the demultiplexer 20 with a first output terminal of the demultiplexer 57.

FIG. 2B shows a system in which, in FIG. 2A, the output terminal of the multiplexer 17 is connected to the input terminal of the multiplexer 54, and the input terminal of the demultiplexer 20 is connected to the first output terminal of the demultiplexer 57. The system can continue the service, as it is, only by a mere simple switching.

On the other hand, the first downstream transmission line, which has been connected through the optical fiber 2-2, is changed so that the transmitter 18 is connected with the subscriber, and the receiver 19 is connected with the center side, and the preparation is made separately by using it as the second upstream transmission line. There are added the multiplexer 32 for multiplexing aural and facsimile signals on the subscriber side and the demultiplexer 33 for demultiplexing the two signals on the center side. Thus the loop-back test is carried out by using the auxiliary fiber 2-4, independently of the active line.

FIG. 2C shows a system in which, in FIG. 2B, the output terminals of the telephone set and the facsimile transmission set on the subscriber side are connected with the input terminal of the multiplexer, and the output side of the demultiplexer 33 in the center is connected with a switching system, etc., disposed separately within the center. Such switching can be carried out without substantial interruption of the service. In this way, the switching operation to change the upstream transmission line to the second transmission line having a capacity larger than that of the first transmission line has been terminated. The optical fibers 2-1 and 2-2, which have become unnecessary, can be used as the auxiliary fibers at the following updating of the system.

Figure 6A:
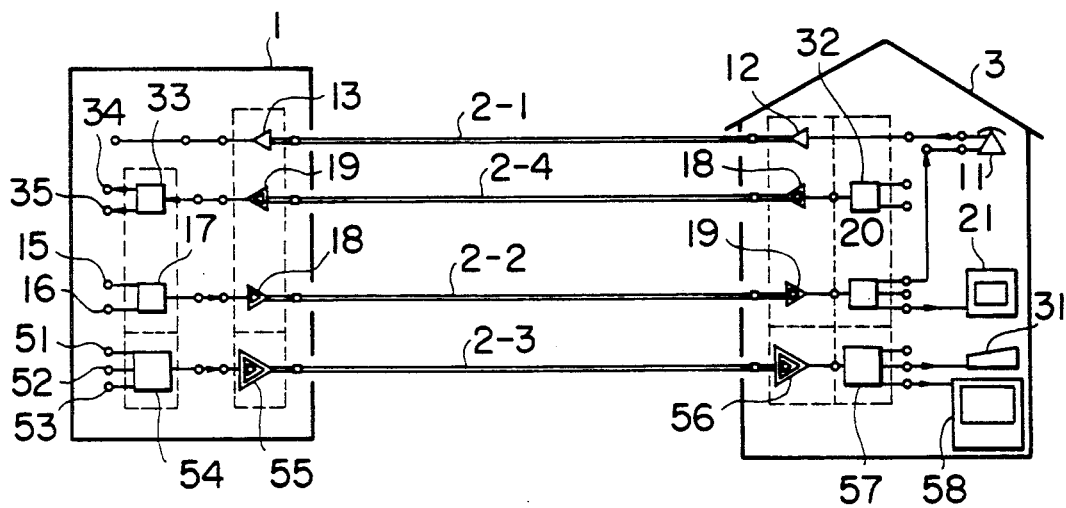
FIGS. 6A, 6B, 7A, 7B are schemes illustrating different embodiments of this invention.
Figure 6B:
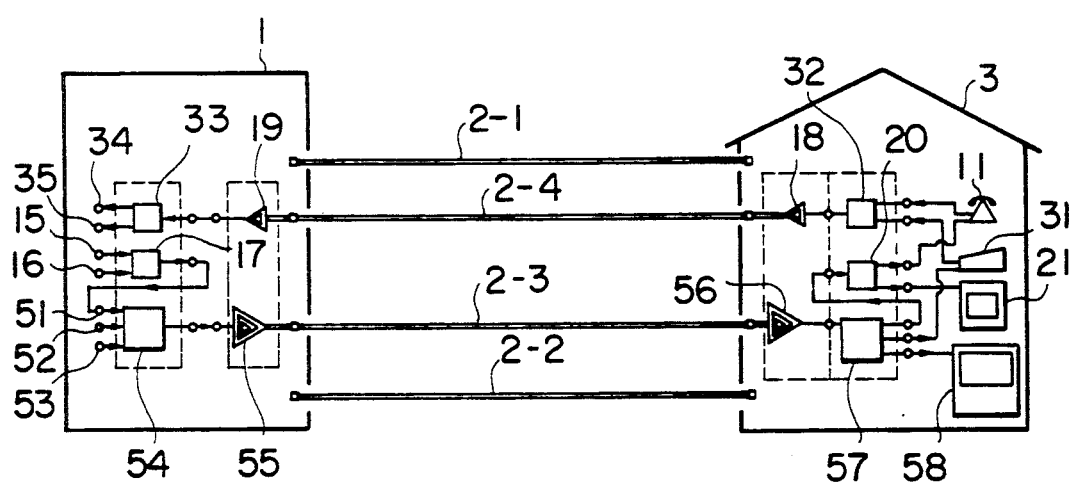
Figure 7A:
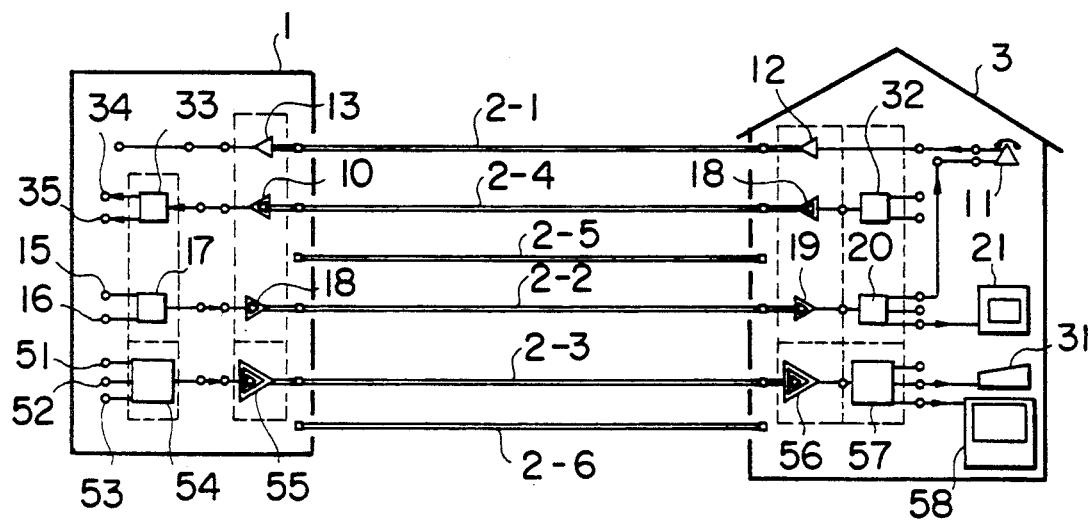
Figure 7B:
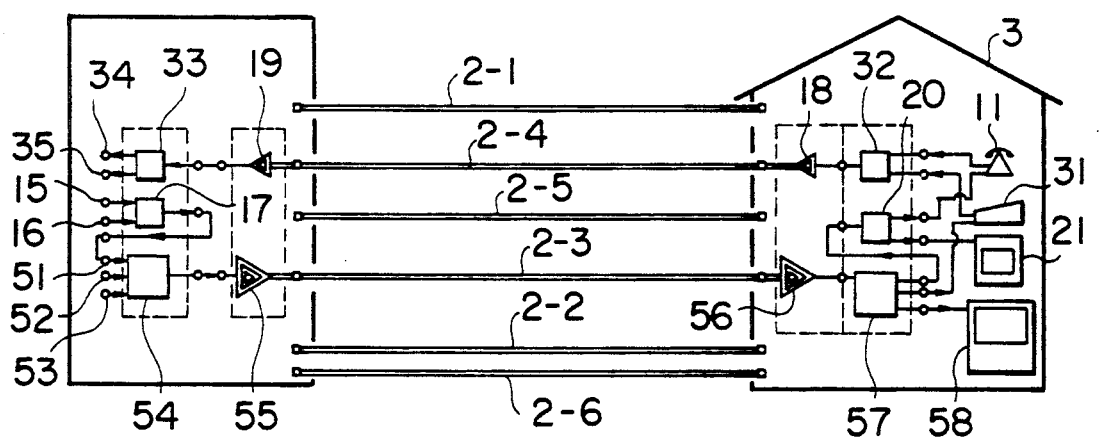

In the case where spares for the transmitter and receiver 18-19 can be used, it is obvious that the switching can be carried out at once by using the two auxiliary fibers. FIGS. 6A and 6B show an example, in which no loop-back test is performed. In the case where the loop-back test is performed, as indicated in FIGS. 7A and 7B, four auxiliary fibers 2-3, 2-4, 2-5 and 2-6 may be used.

Figure 3A:
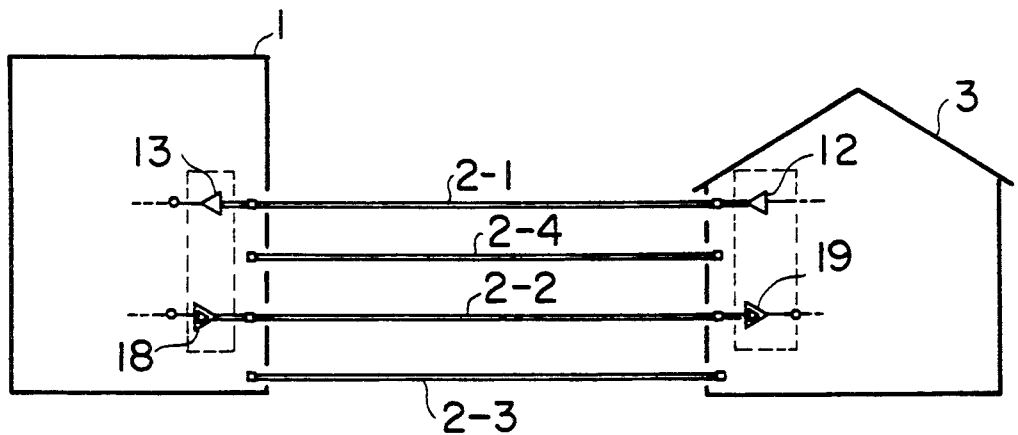

It is possible also to reduce the number of used fibers by using a wavelength division multiplexer (WDM). This will be explained, referring to FIGS. 3A, 3B and 3C. FIG. 3A shows an example already explained, in which four fibers are used. In the case where two-wavelength division multiplexers 60-61 are used, the same effect can be obtained by using only three fibers. Further, it is obvious from FIG. 3C that the number of fibers can be reduced to two by using 3 wavelength division multiplexers. Furthermore, although it is not shown in the figure, it is possible also to make a shift with one fiber by using a wavelength division multiplexer for two wavelengths for every direction, a total of four wavelengths.

Figure 3B:
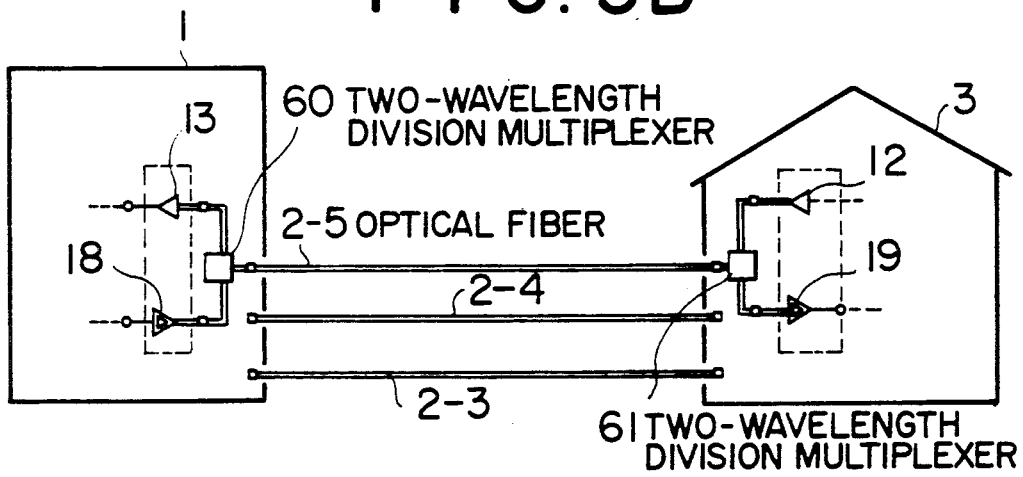
Figure 3C:
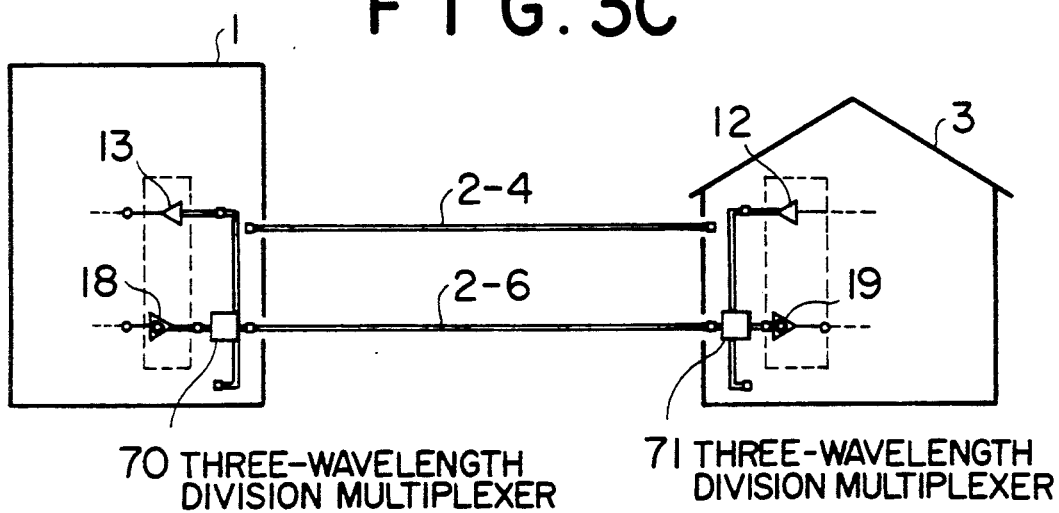
Figure 4:
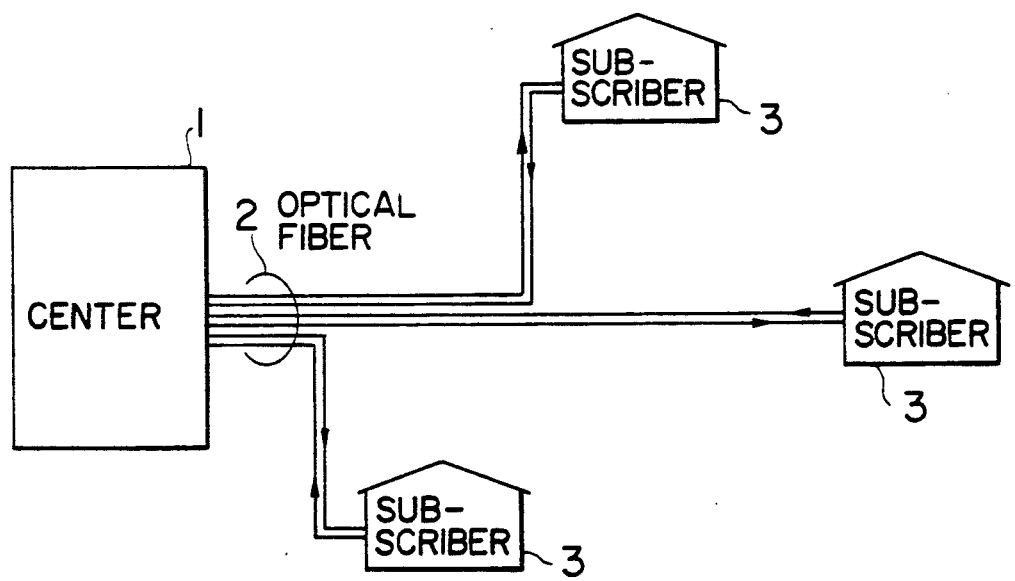
FIG. 4 shows an example of the construction of the optical subscriber network transmission system, to which this invention is applied.
Figure 5A:
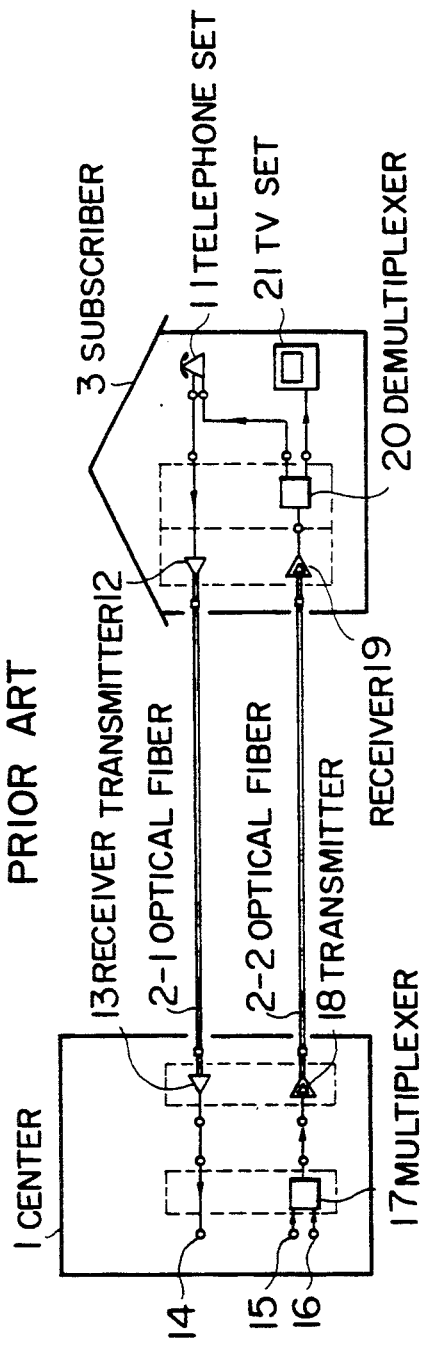
FIGS. 5A and 5B show an example of the construction before and after upgrading of service capacity, respectively, in the case where a particular subscriber is taken-out from FIG. 4.
Figure 5B:
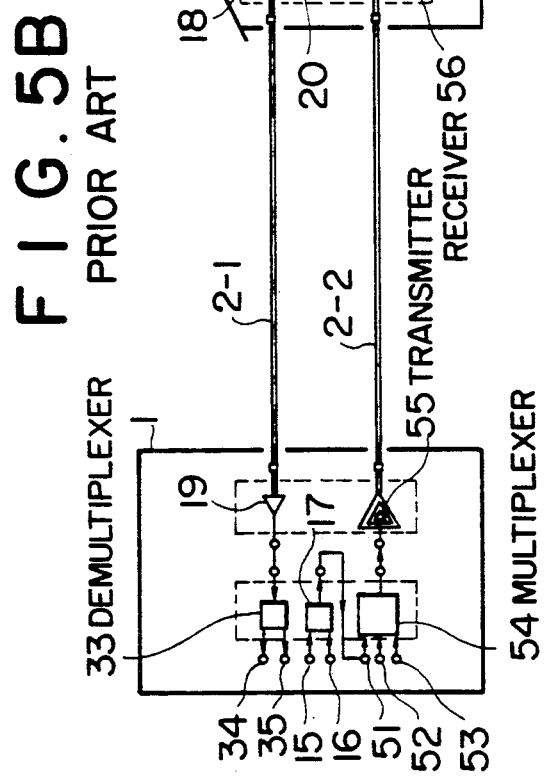

The price of the wavelength division multiplexers to be used should determine the choice of the system indicated in FIG. 3B or that indicated in FIG. 3C. It is advantageous to use the system indicated in FIG. 3C, if the difference in the price between the 2-wavelength division multiplexer and the 3-wavelength multiplexer is smaller than the price of one optical fiber.

Now another method will be explained, by which no special auxiliary transmission line is disposed at the time of initial installation, and an updated system is constructed by disposing newly an auxiliary transmission line by means of optical wavelength division multiplexers at the updating.

FIG. 11A shows an example, in which the second downstream transmission line is constructed by using wavelength division multiplexers 100, 110. The multiplexer 54 on the transmission line 54 has three input terminals. Connecting the output of the multiplexer 17 with the terminal 51, it is possible to transmit the service of the first downstream transmission line, included in the second downstream transmission line. In this example the terminal 52 is one for facsimile signals and the terminal 53 is one for high definition TV. The output signal of this multiplexer is applied to the transmitter 55. This can transmit signals of capacity larger than that of the transmitter 18. This is received by a receiver 56. It is a matter of course that this capacity is designed to be larger than that of the receiver 19. The received signals are demultiplexed by the demultiplexer 57 and inputted in the facsimile set 31 and the high definition TV receiver 58. This transmission line can be tested without interrupting the service of the first upstream and the first downstream transmission lines. The test can be performed by connecting a circuit, which is simulatively equivalent to the demultiplexer 20, with the first output terminal of the demultiplexer 57.

FIG. 11A shows an example in which, in FIG. 11A, the output terminal of the multiplexer 17 is connected with the input terminal of the multiplexer 54, and the input terminal of the demultiplexer 20 is connected with the first output terminal of the demultiplexer 57 so that it can continue the service, as it is, by a simple switching operation.

On the other hand, the first downstream transmission line, which has been connected through the optical fiber 2-2, is changed so that the transmitter 18 is connected with the subscriber and the receiver 19 is connected with the center side, and the preparation is made separately by using it as the second upstream transmission line through the wavelength division multiplexers 100, 110 inserted in the optical fiber 2-1. There are added the multiplexer 32 for multiplexing aural and facsimile signals on the subscriber side and the demultiplexer 33 for demultiplexing the two signals on the center side. Thus, the test is carried out, independently of the active line.

FIG. 11C shows a system in which, in FIG. 11B, the output terminals of the telephone set and the facsimile transmission set on the subscriber side are connected with the input terminal of the multiplexer, and the output side of the demultiplexer 33 in the center is connected with a switching system, etc., disposed separately within the center. Such switching can be carried out almost without interrupting the service. In this way, the switching operation to change the upstream transmission line to the second transmission line having a larger capacity than that of the first transmission line has been terminated.

The wavelength division multiplexers 100, 110, which have become unnecessary, can be used at the following upgrading of the system.

In the case where spares for the transmitter and receiver 18-19 can be used, it is obvious that the switching can be carried out at once by using the two pairs of wavelength division multiplexers. This is shown in FIGS. 12A and 12B.

Figure 12A:
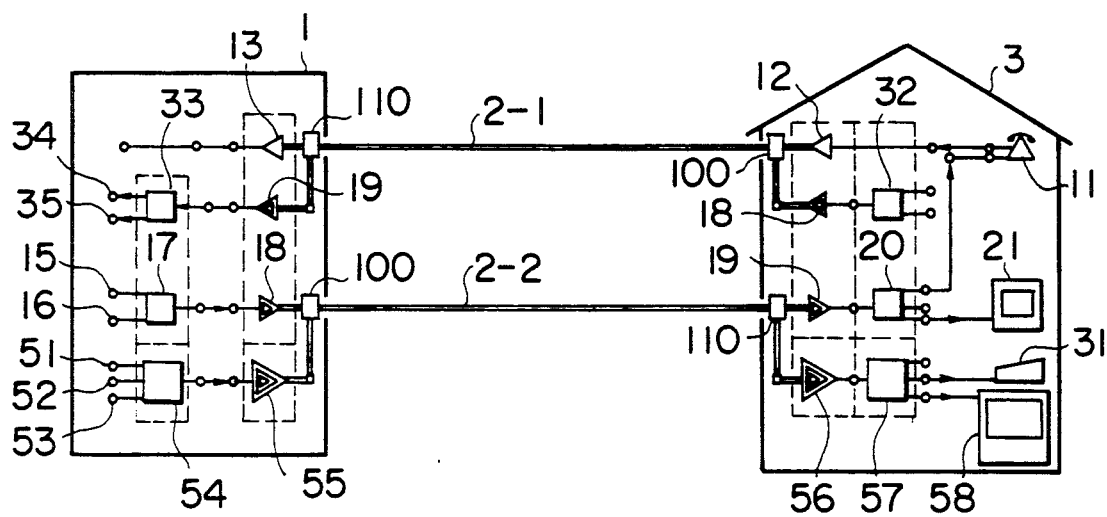
Figure 12B:
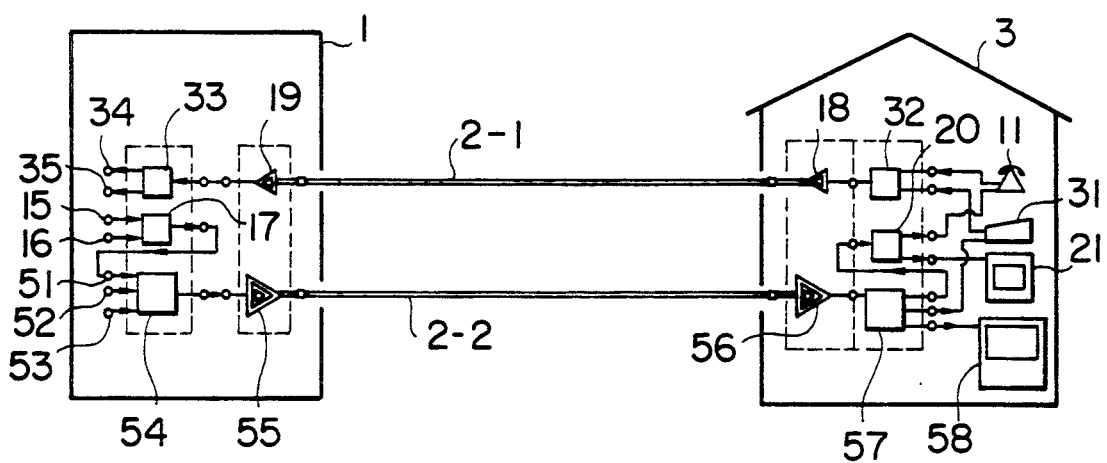

In the system indicated in FIG. 12A the upstream and downstream transmission lines can be tested simultaneously by using the wavelength division multiplexers 100 and 110 connected with the optical fibers 2-2 and 2-1, respectively. The upgrading of the system, as indicated in FIG. 12B, can be performed by switching the system at the point in time where this has been terminated, and removing the wavelength division multiplexer and old equipment.

Figure 13A:
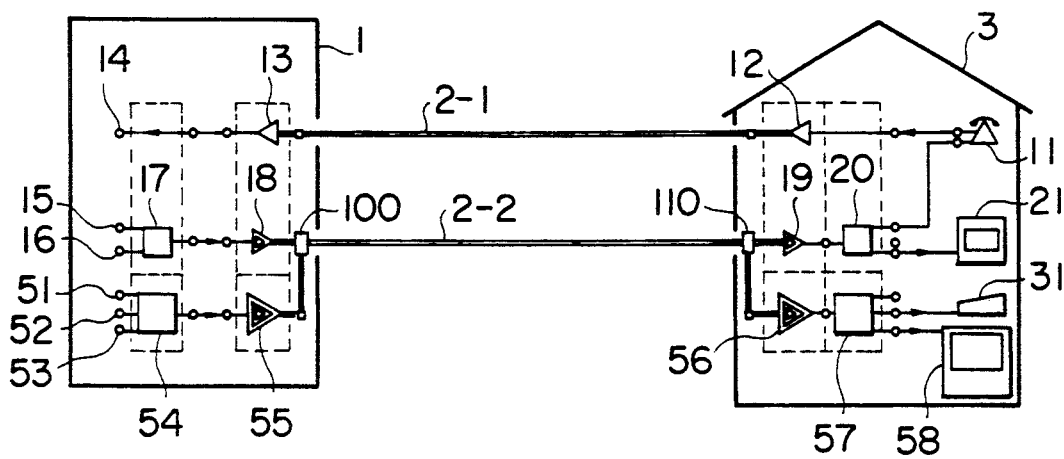
Figure 13B:
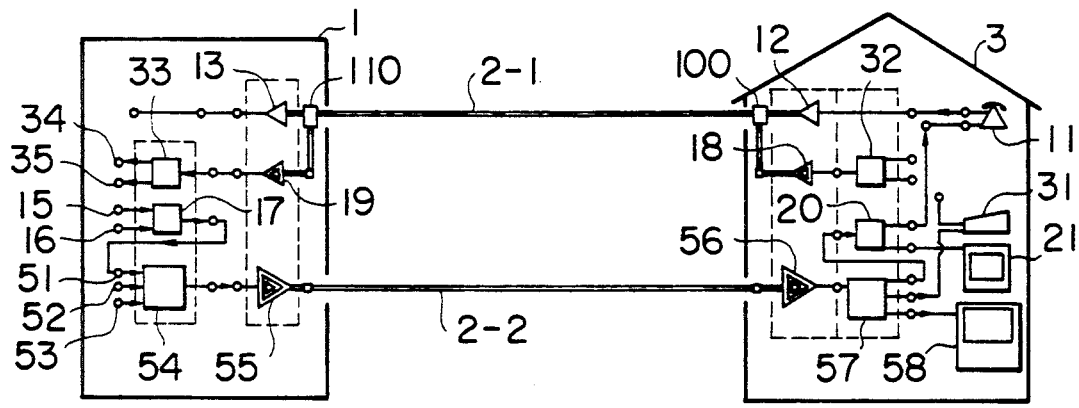
Figure 13C:
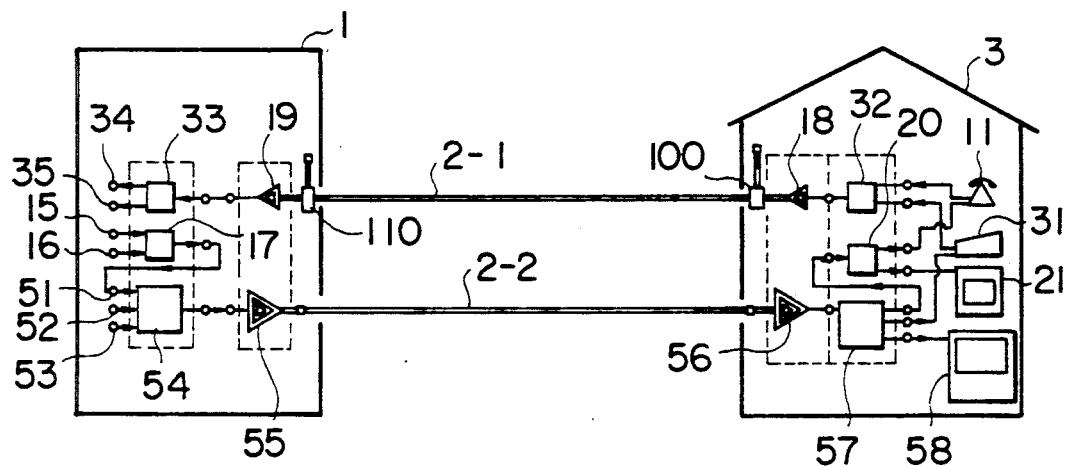

Although FIGS. 11A-11C, 12A and 12B are examples which describe the removal of the wavelenght division multiplexers after the upgrading of the system, have it is possible also to leave the wavelength division multiplexers, as indicated in FIGS. 13A, 13B and 13C, so that they can be used at the following upgrading of the system.

Figure 14A:
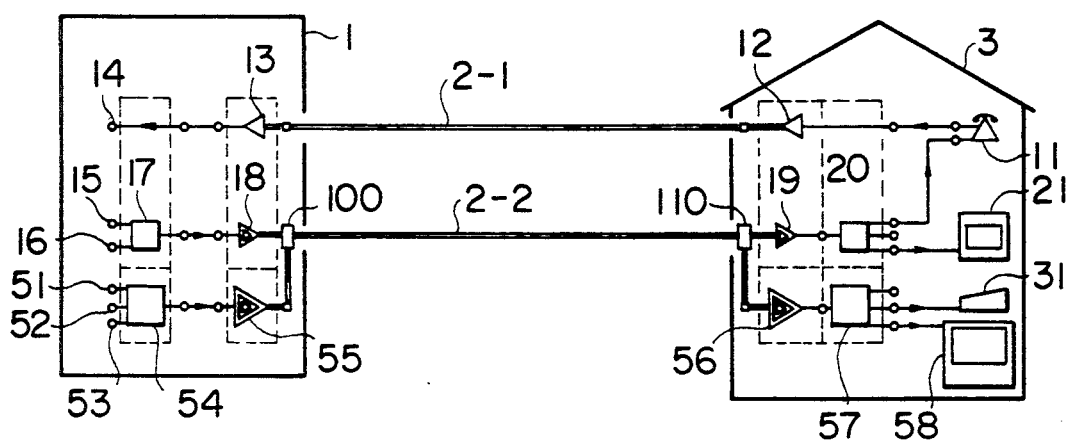
Figure 14B:
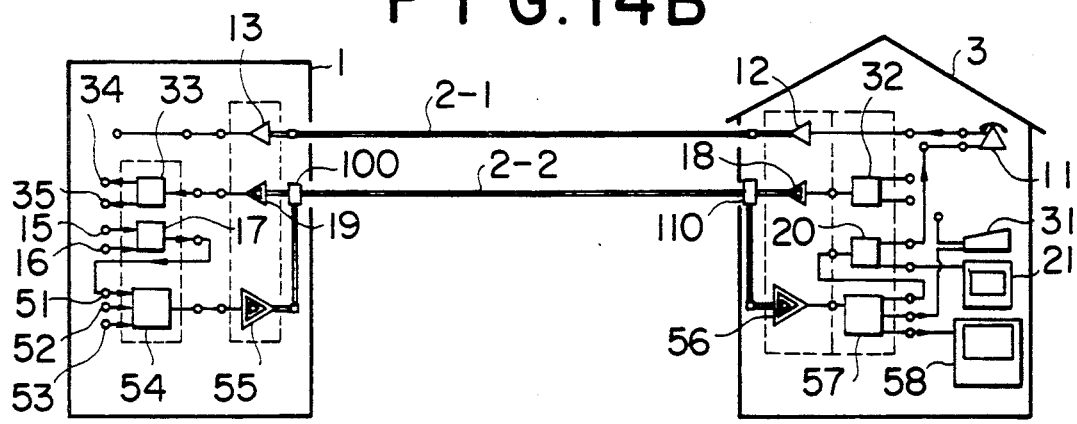
Figure 14C:
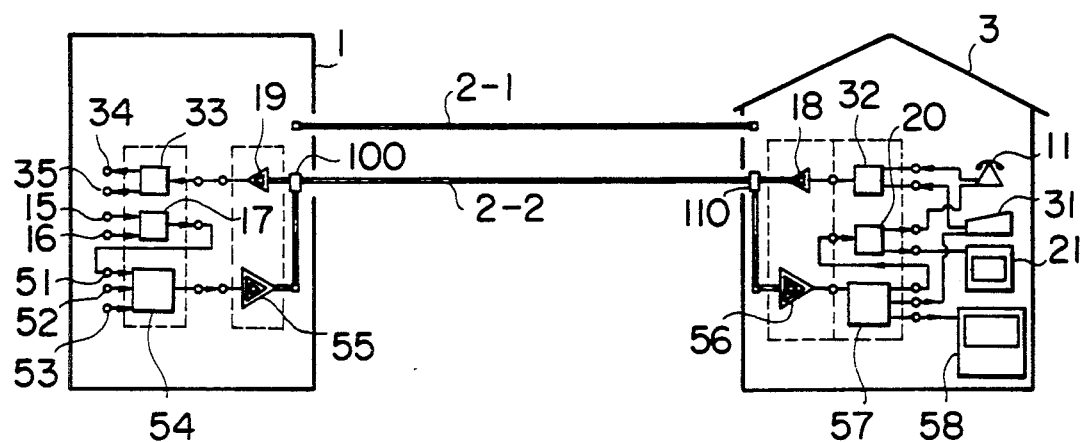

FIGS. 14A, 14B and 14C show another example, in which the wavelength division multiplexers are left after the upgrading of the system. In this example the transmission of signals is effected bidirectionally through common fibers in the upstream and downstream transmission lines by using the optical fiber 2-2 and the wavelength division multiplexers 100, 110, while the remaining optical fiber 2-1 can be used at the following upgrading of the system.

Contrary to the case described above, where a system in which separate optical fibers are used for the upstream and downstream transmission lines is upgraded, another method of upgrading a system, in which signal transmission is effected bidirectionally, i.e., in the upstream and downstream directions through a common fiber by means of wavelength division multiplexers, will be explained below, referring to FIGS. 15A and 15B.

Figure 15A:
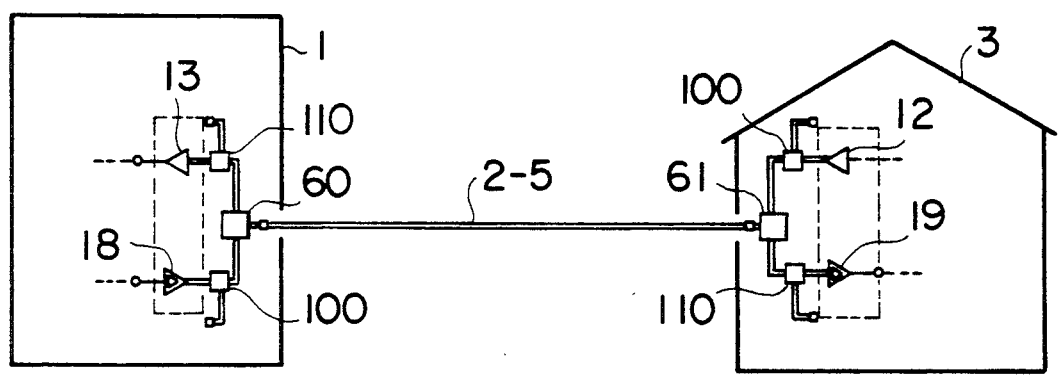

FIG. 15A shows an example in which to the existing 2-wavelength division multiplexers 60 and 61 are connected further identical 2-wavelength division multiplexers 100 and 110, and a test for the upgrading is performed by using them.

Figure 15B:
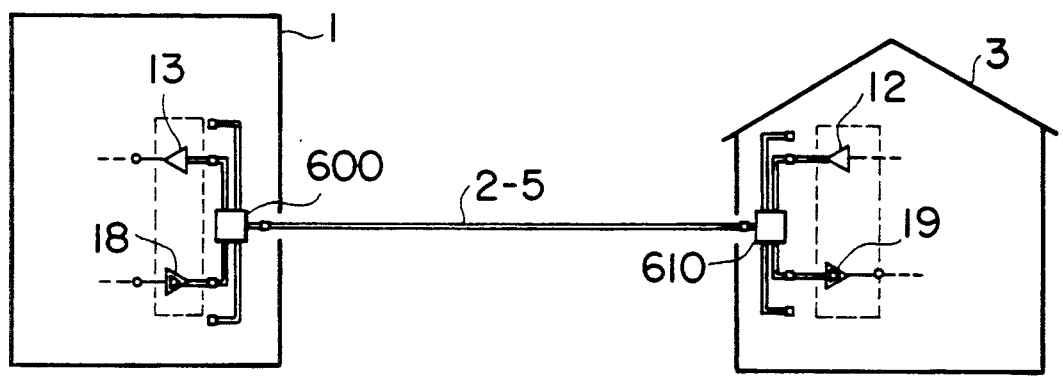

In contrast, FIG. 15B shows an example in which the upgrading of the system is effected by using 4-wavelength division multiplexers 600 and 610 in lieu of the existing 2-wavelength division multiplexers 60 and 61.

Figure 8:
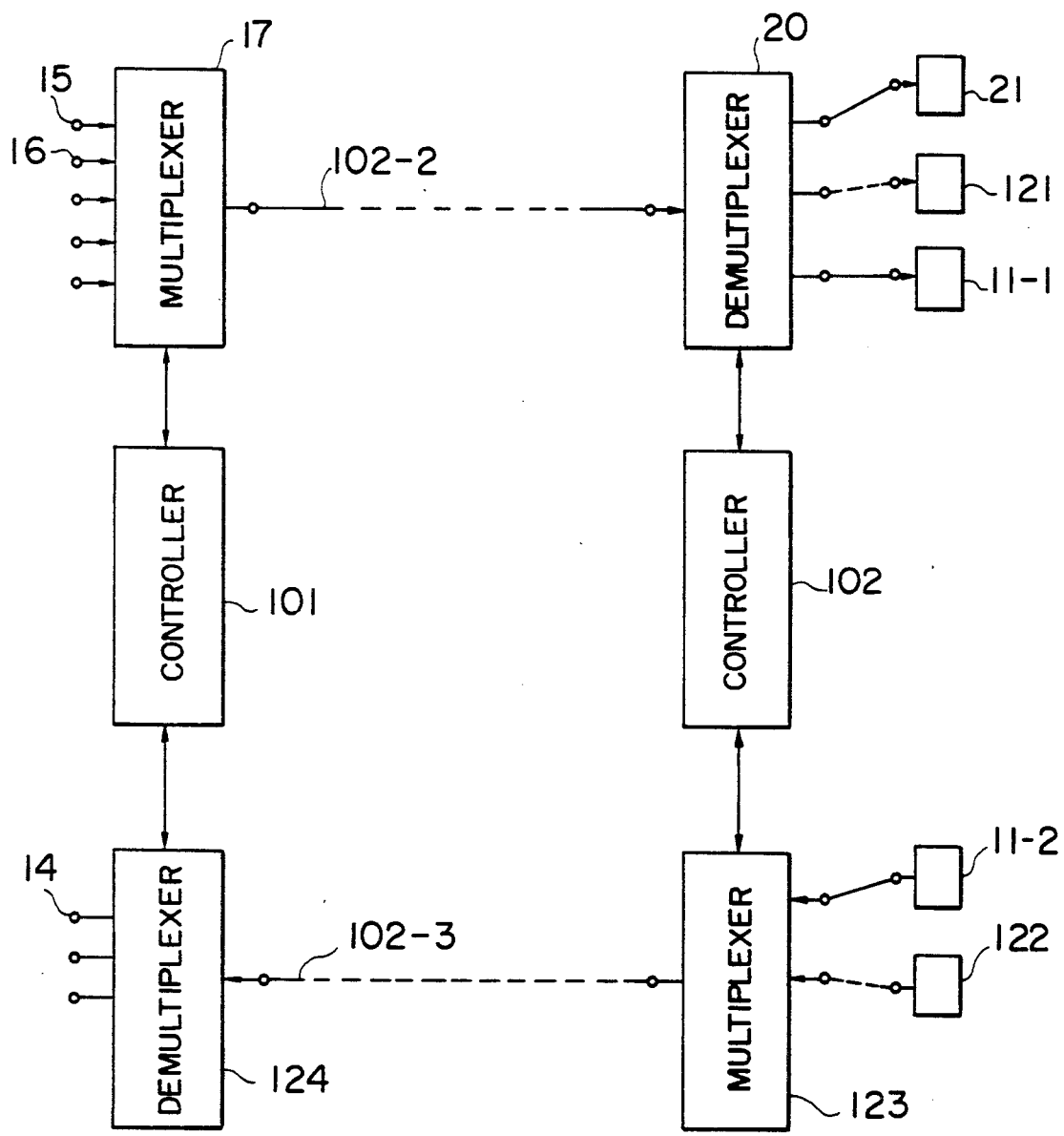
FIGS. 8 and 9 are schemes illustrating different multiplexers in detail.

The multiplexer will now be explained in detail. FIG. 8 indicates the construction of the multiplexer portion in FIG. 1 in detail. However, for illustration purposes, the transmission line portions (optical fibers 2-1, 2-2, as well as transmitters and receivers 12, 13; 18, 19) have been simplified and are indicated by 102-2, 102-3. Although the multiplexer 17 on the center side has two input terminals (15, 16) in FIG. 1, in reality it is so formed that two kinds of signals are selected among a number of input signals. This control is effected by the fact that a selection signal coming from a terminal 11-2 on the subscriber side is given to a control circuit 101 through an optical transmission line 102-3, and in this way the multiplexing structure of the multiplexer 17 is set. On the subscriber side it is selected by the demultiplexer 20 through the control circuit 102 whether or not the multiplexed signals are outputted through the respective terminals. The upstream transmission line from the subscriber to the center side is likewise selected by instructions from the control circuits 101-102, from which terminal the signal is multiplexed by a multiplexer 123 and through which terminal it is outputted by a demultiplexer 124 on the center side.

Figure 9:
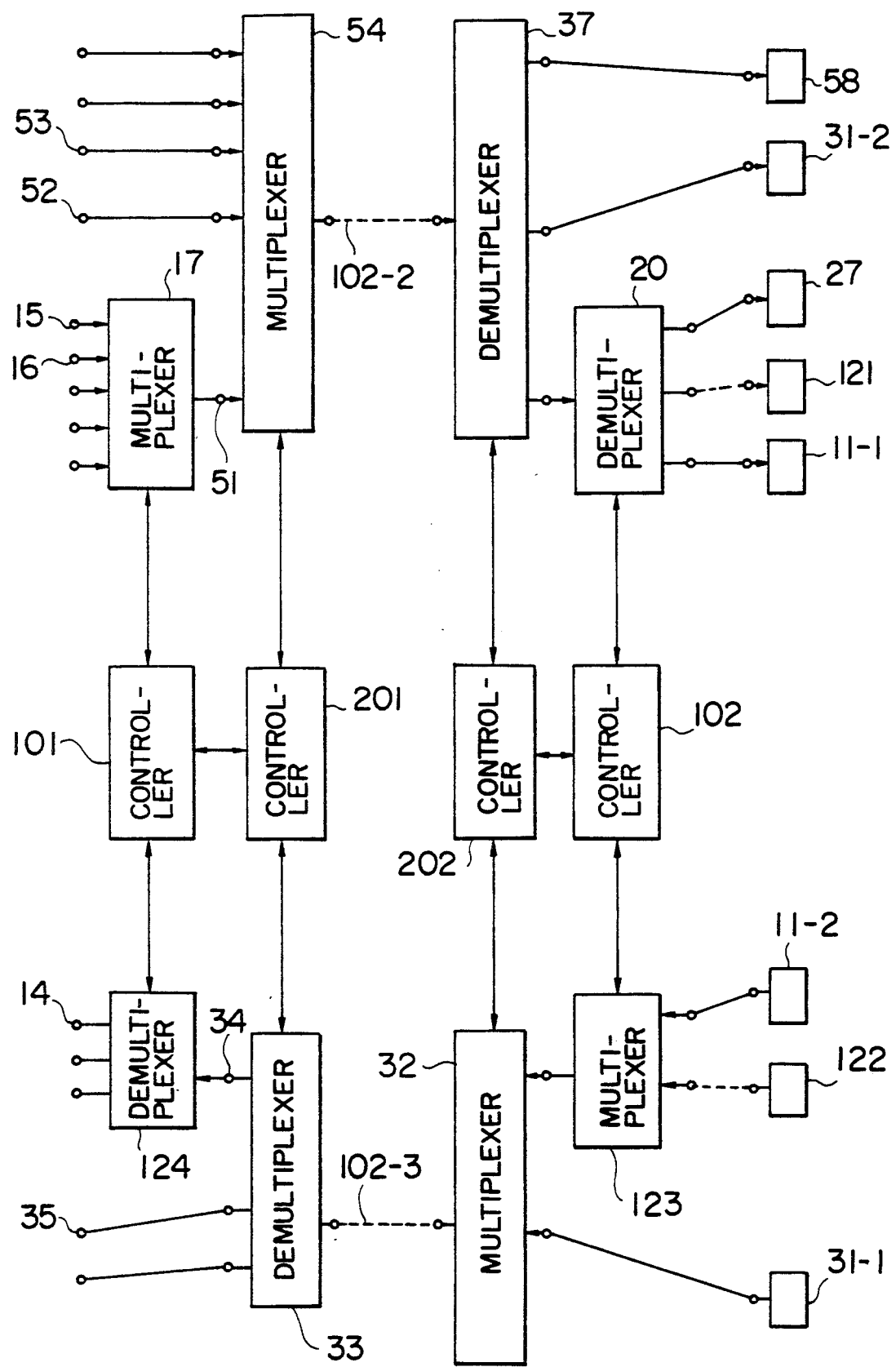

Next, the multiplexing structure (FIG. 2C) in the case where the capacity is upgraded will be described in detail. As indicated in FIG. 9, the output 51 of the multiplexer 17 is multiplexed with other signals in the multiplexer 54. The multiplexing structure is controlled by a control circuit 201. This signal is inputted in the demultiplexer 37 through the transmission line 102-2 and demultiplexed under the control of a control circuit 202. Also for the upstream transmission line (subscriber→center) transmission, multiplexing and demultiplexing of the signal are effected by means of similar multiplexer 32 and demultiplexer 33, and the control circuits 201 and 202.

Figure 10A:
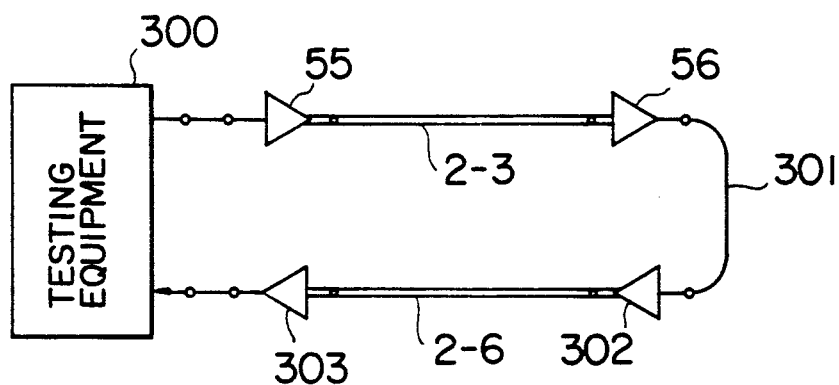
FIGS. 10A, 10B and 10C are schemes for explaining a loop-back test.
Figure 10B:
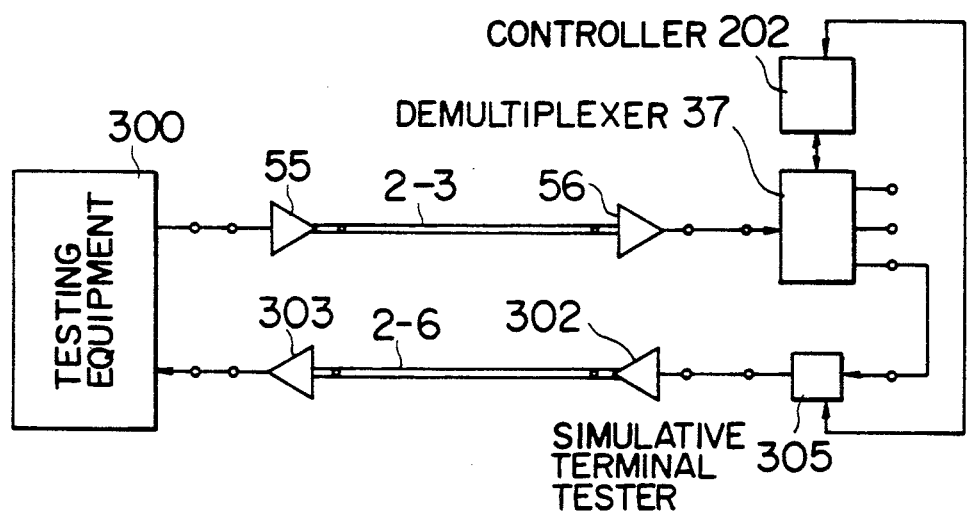
Figure 10C:
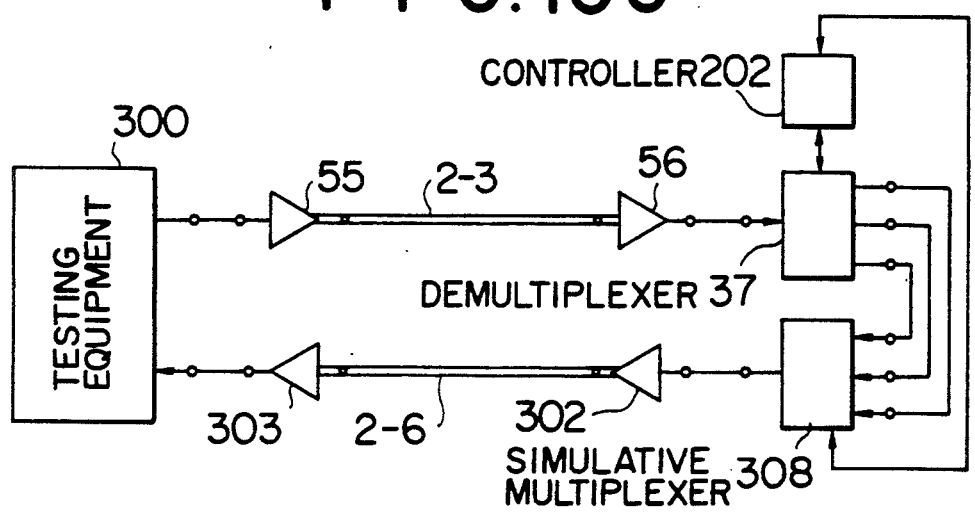

Now the loop-back test will be explained, referring to FIGS. 10A, 10B and 10C. Explanation is made for the loop-back test using the optical fibers 2-3 and 2-6 in FIG. 7. At first, as indicated in FIG. 10A, a test signal is transmitted from a testing device 300 to the optical transmitter 55, the optical fiber 2-3 and the optical receiver 56. This signal is sent back through a loop-back cable 301, a testing optical transmitter 302, an optical fiber 2-6 and a testing optical receiver 303, and thus transmission characteristics are tested. Then the structure is switched to the one that indicated in FIG. 10B, and the demultiplexer 37 and the control circuit 202 are tested by means of a stimulative terminal tester 305. Then, a performance check, such as signal switching to different terminals, is effected. Further, the structure is switched to the one that indicated in FIG. 10C, and the check of multiplexer reconfiguration characteristics is effected by means of a stimulative multiplexer tester 308. After the termination of the loop-back test described above, the terminals are connected and the final confirmation test is effected.

As explained above, according to this invention a remarkable effect can be obtained in that, contrary to the common supposition that the implementation of subscriber upgrading is accompanied, by a service interruption of several weeks, a switching operation can now be made with a negligibly short service interruption.

I claim:

1. An optical network system comprising:
   a center having a transmitter and a receiver for sending and receiving information;
   a subscriber having a transmitter and a receiver for sending and receiving information, said subscriber transmitter having a given information sending performance;
   a first optical transmission line connecting the transmitter of the center and the receiver of the subscriber, for transmitting information from the center to the subscriber;
   a second optical transmission line connecting the transmitter of the subscriber and the receiver of the center, for transmitting information from the subscriber to the center at a performance up to said given information sending performance;
   a means for sending information from said subscriber to said center at a performance higher than said given performance, said means including a first auxiliary optical transmission line laid between the center and the subscriber; and
   a means for testing at least one of said optical transmission lines without substantially interrupting information transmission through said at least one tested line, said testing means including a second auxiliary optical transmission line laid between the center and the subscribed.

2. An optical network system comprising:
   a center having a transmitter and a receiver for sending and receiving information, said subscriber transmitter having a given information transmission performance;
   a first optical transmission line connecting the receiver of the subscriber and the transmitter of the center for transmitting information from the center to the subscriber;
   a second optical transmission line connecting the transmitter of the subscriber and the receiver of the center for transmitting information from the subscriber to the center; and
   a means for sending information from said subscriber to said center at a performance higher than said given subscriber transmission performance, said means including a first and second auxiliary optical transmission line, each laid between the center and the subscriber, and a means for selectively connecting said auxiliary optical transmission lines between said center and said subscriber.

3. A method for upgrading an information capacity of an optical network system, having a center for sending and receiving information, a subscriber for sending and receiving information, a first downstream transmission line, one end of which connects to a first transmitter in said center and the other end of which connects to a first receiver in the subscriber for transmitting information from the center to the subscriber, a first upstream transmission line, one end of which connects to second receiver in said center and the other end of which connects to a second transmitter in said subscriber for transmitting information from the subscriber to the center, and first and second auxiliary optical transmission lines laid between the center and the subscriber, comprising the steps of:

implementing a second downstream transmission line, comprising said first auxiliary optical transmission line, by connecting one end of said first auxiliary line to a third transmitter in said center and the other end of said first auxiliary line to a third receiver in the subscriber;

testing said second downstream transmission line, without substantial interruption of information through said first upstream transmission line and said first downstream transmission line, said testing including routing a test data through said second auxiliary optical transmission lines;

implementing a second upstream transmission line by disconnecting said first downstream transmission line from said first transmitter and said first receiver and connecting said first downstream transmission line between a fourth transmitter located in said center and a fourth receiver located in said subscriber;

testing said second upstream transmission line, without substantial interruption of information through said first upstream line and said second downstream line said, said testing including routing a test data through said second auxiliary optical transmission line; and implementing a third auxiliary optical transmission line comprising said first upstream transmission line by disconnecting said first upstream transmission line from said second transmitter and said second receiver.

4. A method of upgrading an optical network system according to claim 3, wherein said removal first receiver is used as said fourth receiver.

5. An optical network system comprising:
a center having a means for sending and receiving optical frequency division multiplexed information, said means including a center transmitter, a center receiver, a center optical wavelength multiplexer, and a center optical wavelength demultiplexer, each having an input and an output;
a subscriber having a means for sending and receiving optical frequency division multiplexed information, said means including a subscriber transmitter, a subscriber receiver, a subscriber optical wavelenght multiplexer, and a subscriber optical wavelenght demultiplexer;
an optical transmission line, having a given information capacity, connecting an output of said center multiplexer, an input of said center demultiplexer, an output of said subscriber multiplexer and an input of said subscriber demultiplexer, for transmitting information between the center and the subscriber;
an auxiliary means for transmitting an optical information, including an information in excess of said given capacity, from said subscriber to said center, said means including a first auxiliary optical transmission line laid between the center and the subscriber; and
a means for transmitting a test data indicative of a condition of at least one of said optical transmission lines, said means including a second auxiliary optical transmission line laid between the center and the subscriber.

6. An optical network system comprising:
a center having a means for sending and receiving optical frequency division multiplexed information, said means including a center transmitter, a center receiver, a center optical wavelength multiplexer, and a center optical wavelength demultiplexer;
a subscriber having a means for sending and receiving optical frequency division multiplexed information, said means including a subscriber transmitter, a subscriber receiver, a subscriber optical wavelenght multiplexer and a subscriber optical wavelenght demultiplexer;
an optical transmission line connected to an output of the center multiplexer, an input of the center demultiplexer, an output of the subscriber multiplexer and an input of the subscriber demultiplexer, for transmitting information between the center and the subscriber;
a means for transmitting an optical test data indicative of a condition of said optical transmission line, said means including an auxiliary optical transmission line laid between the center and the subscriber.

7. An optical network system comprising:
a center having a means for sending and receiving optical information, said means including a center transmitter and a center receiver;
a subscriber having a means for sending and receiving optical information, said means including a subscriber transmitter and a subscriber receiver;
a means for transmitting optical information from said center to said subscriber, said means comprising a first optical transmission line connecting said center transmitter to said subscriber receiver;
a first means for transmitting optical information from said subscriber to said center, said means comprising a second optical transmission line connecting said subscriber transmitter to said center receiver,
a first and second auxiliary optical transmission line laid between the center and the subscriber, for use in the event of upgrading of subscriber transmission capability.

8. An optical network system according to claim 7, further comprising a third auxiliary optical transmission line laid between the center and the subscriber, for use in the event of testing at least one of said optical transmission lines.

9. A method of upgrading an information capacity of an optical network system having a center for sending and receiving information, a subscriber for sending and receiving information, a downstream transmission line, one end of which connects to a first transmitter in the center and the other end of which connects to a first receiver in the subscriber for transmitting information from the center to the subscriber, and a upstream transmission line, one end of which connects to a second receiver in the center and the other end of which connects to a second transmitter in the subscriber for transmitting information from the subscriber to the center, comprising the steps of:

inserting a first optical wavelength division multiplexer between said first transmitter in the center and one end of said downstream transmission line, said first transmitter being connected to a first input of said first optical wavelength division multiplexer, and inserting a first optical wavelength division demultiplexer between said first receiver in the subscriber and the other end of said downstream transmission line, said first receiver being connected to a first output of said first optical wavelength demultiplexer;

connecting a third transmitter to a second input of said first optical wavelength division multiplexer and a third receiver to a second output of said first optical wavelength division multiplexer;

removing said first transmitter from the first optical wavelenght division multiplexer and the first receiver from the first optical wavelength division demultiplexer;

inserting a second optical wavelength division demultiplexer between said second receiver in the center and one end of said upstream transmission line, said second receiver being connected to a first output of said second optical wavelength division demultiplexer, and inserting second optical wavelength division multiplexer between said second transmitter in the subscriber and the other end of said upstream transmission line, said second transmitter being connected to a first input of said second optical wavelength division multiplexer;

connecting a fourth receiver to a second output of said second optical wavelength division multiplexer and a fourth transmitter to a second input of said second optical wavelength division demultiplexer; and removing the second receiver from said second optical wavelength division demultiplexer and the second transmitter from said second optical wavelength division multiplexer.

10. A method of upgrading an optical network system according to claim 9, said removed first transmitter is used as said fourth transmitter and said removed first receiver is used as said fourth receiver.

11. A method of upgrading an optical network system according to claim 9, further comprising the steps of:

removing the first optical wavelength division demultiplexer and connecting the third transmitter with the downstream transmission line;

removing the first optical wavelength division demultiplexer and connecting the third receiver with the downstream transmission line;

removing the second optical wavelength division multiplexer and connecting the fourth transmitter with the upstream transmission length; and removing the second optical wavelength division demultiplexer and connecting the fourth receiver with the stream transmission line.

12. A method of upgrading an optical network system according to claim 11, said removed first transmitter is used as said fourth transmitter and said removed first receiver is used as said fourth receiver.

* * * * *